United States Patent Office 3,467,617
Patented Sept. 16, 1969

3,467,617
MOUNTING MEDIUM, MANUFACTURE AND
USE THEREOF
Theodore E. Weichselbaum and Benjamin D. Zmuda, St.
Louis, Mo., assignors to Brunswick Corporation, a corporation of Delaware
No Drawing. Filed Oct. 27, 1966, Ser. No. 589,845
Int. Cl. C08f 27/00; C09j 3/14
U.S. Cl. 260—33.6                                    13 Claims

ABSTRACT OF THE DISCLOSURE

A liquid shelf stable non-fluorescent mounting medium for mounting biological specimens on glass and like mounting surfaces, comprising a solution in an aromatic hydrocarbon solvent of a thermoplastic acrylic polymer, such as a polymer of n-butyl methacrylate. The polymer is rendered non-fluorescent by treating it with a metal oxide, such as litharge, at a temperature above the melting point of the polymer.

---

This invention relates to compositions which can be used for mounting specimens on glass and like surfaces. The invention further relates to the manufacture and use of such compositions.

Resinous compositions containing a resin and solvent have long been used for the purpose of mounting specimens on glass and like surfaces. Such resinous compositions are commonly known as mounting media or mountants and are particularly useful in the mounting of tissues or tissue slices on a surface such as the glass surface of a microscope slide for purposes of histological studies. Such a composition should be fast drying. Once dried the composition should be capable of retaining brilliance in the mounted specimen and also retaining stain intensity in a stained specimen. The composition should also be at least relatively non-fluorescent where it is to be used for mounting specimens for histological studies.

Many resins have previously been proposed for use in formulating mounting media. Such compositions have included Canada balsam, polystyrene, naphthene, cycloparaffin and naphthalene polymers, terpene polymers, euparals and diaphanes, chlorinated allyl ester polymers, cedar oil, gum dammar, cumerone and cumerone-indene resins, mixtures of chlorinated hydrocarbons and hydrated ketones, ester gums, gum sandarae, plasticized vinyl resins, methyl methacrylate polymers, isobutyl methacrylate polymers, and the like. For use as a non-fluorescent mounting medium for histological studies, buffered-glycerin mountants have been routinely used. However, the buffered-glycerin mountant gives only a temporary preparation, and slides made using the mountant lose their brilliance and intensity of staining fairly rapidly. Such impermanence in a mounted microscope slide precludes rechecking results, e.g. on the following day by a supervisor of the original worker, and also precludes the comparison of results of experiments conducted over even short periods of time.

Among the above listed resins which have been suggested for use in mounting media, the methyl methacrylate polymers and the isobutyl methacrylate polymers are the closest structurally to the present compositions. The methyl methacrylate polymers have been prepared for use in solutions of dioxane, acetone, amyl acetate and ethyl acetate. In such use rapid fading of stains has been reported and the clearing of the specimen has been less satisfactory than when balsam or dammar were used. Although the solution in dioxane sets firmly in about an hour, air spaces are formed under the slide cover glasses on drying. Also, the methyl methacrylate polymer is only slightly soluble in aromatic solvents such as xylene. The isobutyl methacrylate polymers have been used in benzene or xylene solution and have been noted to have poor adherence to glass, rapid fading of certain stains and low softening at decomposition temperature. Thus, in view of these deficiencies the need still exists for an excellent non-fluorescent mounting medium for use in histological studies.

It is a general object of this invention to provide a new and useful non-fluorescent mounting medium.

Another object of this invention is to provide a shelf stable non-fluorescent mounting medium which is reasonably fast drying and retains brilliance and stain intensity in the mounted specimen over an extended period of time.

Still another object is to provide a new and useful liquid mounting medium containing a resin having good solubility in aromatic solvents.

Another general object of this invention is to provide a treated peroxide polymerized polymer which is non-fluorescent and suitable for use in solution as a mounting medium and to provide a method of treating the peroxide polymerized polymer for rendering it relatively non-fluorescent by removing oxidation and reducing agents from the polymer.

Many of the synthetic resins which have previously been used in mounting medium are prepared by the peroxidic polymerization of a monomer or resin and have residual oxidation or reducing agents which contribute fluorescence to the polymer. It is therefore another object of this invention to eliminate the residual oxidation and reducing agents which may be present in a resinous composition as a result of peroxidic polymerization.

Other objects and features of this invention will be apparent from the description given herein.

In a preferred form, this invention provides a shelf stable solution of a thermoplastic n-butyl methacrylate polymer in an aromatic hydrocarbon solvent as an adhesive formulation suitable for use in mounting specimens on glass or like surfaces. Poly-n-butyl methacrylate is particularly preferred, although copolymers of n-butyl methacrylate with such other acrylic monomers as isobutyl methacrylate, methyl methacrylate, ethylacrylate, or methyl chloroacrylate, may also be used. Preferably such copolymers contain a major proportion e.g. at least 50% by weight, n-butyl methacrylate, although lesser amounts down to and including 10% by weight n-butyl methacrylate units can be used to somewhat lesser advantage.

In the solutions of the polymer which are useful as mounting media in accordance with this invention, the polymer is present in an amount sufficient to impart adhesive properties to the solution, e.g. an amount in the range of 15–55 weight percent or preferably 30–40 weight percent based on total solution.

The acrylic polymer is prepared by catalytically polymerizing the monomers with free radical catalysts. These include the peroxides such as benzoyl peroxide, dicumyl peroxide, cumene hydroperoxide, hydrogen peroxide, t-butyl hydroperoxide, methylethylketone peroxide, and the like, as well as the peracid and perester catalysts such as peracetic acid, t-butyl perbenzoate, potassium persulfate and the like. In the commercial preparation of such polymers a trace of the free radicals, e.g. in the form of the original catalyst, remains in the polymer. Additionally, organic acids are often present. Since a good mounting medium should have an acid number approaching zero and should be non-reducing and free from oxidizing agents, the oxidizing agents should be removed. We have found that this can be accomplished by fusing the acrylic polymer with a metal oxide, such as lead monoxide, i.e. litharge, and that this eliminates the oxidants and/or reducing material from the polymer. We believe that this effect involves the following reactions:

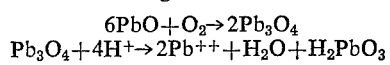

Apparently the $Pb_3O_4$ which is produced in the above reaction also reacts to neutralize any organic or inorganic acids which may be present in the fused polymer. Although the method reactions are illustrated as being reactions of lead oxide, the lead oxide can be substituted by the oxide of any of the metals of Groups 1a, 2a, 3a, 4a or 5a of the Periodic Table, e.g. copper, bismuth, tin, etc. However, lead oxide is preferred.

In treating the polymer with the metal oxide, the thermoplastic polymer is first heated to a melt and a small amount, e.g. from 0.01% to 1.0% of the metal oxide is added to the melt and mixed thoroughly. The removal or deactivation of the oxidizing and reducing agents appears to be almost immediate, and the resulting melt can be dissolved directly in the aromatic hydrocarbon solvent. It is usually not necessary to separate the metal oxide from the solution where the original amount of metal oxide is not in excess of 0.05% by weight based on the polymer. Where some or all of the metal oxide is to be removed, this can be done by known procedures.

Although the treatment with metal oxide has been described with reference to the polymers of n-butyl methacrylate, it would be evident to those in the art that this method can be used with any other thermoplastic peroxide polymerized polymer including the polyolefins such as polyethylene, polybutadiene, polypropylene, polyisobutylene, etc., the polymers of ethylenically unsaturated aromatic compounds such as polystyrene, polydivinyl benzene; allylic polymers such as those of allyl alcohol and the like; the halogenated polymers such as polychloroprene, polytetrafluoroethylene, polyvinyl chloride; and other vinyl polymers such as polyvinyl acetate and the like. Additionally, the method can be used in removing the oxidation and reducing agents from other acrylic monomers such as monomers of tetraethyleneglycol dimethacrylate, trimethylolpropane trimethacrylate, tetrahydrofurfuryl methacrylate, buteneglycol diacrylate, and the like.

As a specific example of a mounting medium formulation, a homopolymer of n-butyl methacrylate, which was prepared by polymerizing n-butyl methacrylate with about 2% benzoyl peroxide and which contained trace amounts of free radicals, was heated to a melt and 0.1% lithrage was added and intimately mixed. The resulting melt was dissolved in purified toluene to provide a solution containing 36.5% polymer by weight. This solution had a consistency of about that of use dilution maple syrup.

The solution was tested for fluorescent characteristics on a Beckman ratio fluorometer with a wave length filter of 360 mu excitation and 450 mu emittance and using a No. 3 glass uranium reference rod. The solution gave a fluorescent value of 0.3, while a like solution of the untreated resin gave values as high as 36. A highly successful commercial synthetic resin based mounting medium solution gave a value of 18, 60 times as much fluorescence as given by the example of this invention.

The mounting medium prepared by the above example was non-acidic, was non-reducing, and was apparently completely free from oxidizing substances. The non-reducing property of the medium makes it very advantageous in mounting preparations showing a Prussian blue reaction. The refractive index of the material was 1.4883 at 20° C. It is considered that a suitable mounting medium should have a refractive index approaching 1.5, and the actual refractive index meets this requirement. The mounting medium for use in mounting specimens dries sufficiently in two hours for examination and within twenty-four hours for storage. Additionally, as evidenced by the above fluorescent value, the mounting medium fluoresces only minimally under red fluorescent light and does not fluoresce under blue light, i.e., blue near ultra-violet. Also, when used as a mounting medium the composition showed excellent adhesion to smooth substrates such as glass. This adhesive property plus the rapid drying property appear to be at least in part advantageous results from the use of a polymer of n-butyl methacrylate. Further, the polymer does not impede transparency in the mounted specimen.

A sample of the above example was submitted for laboratory use on a test basis, i.e. as a substitute for a buffered-glycerin mountant which had previously been used in the laboratory. It was reported that fluorescent antibody preparations mounted in the medium retained their brilliance and intensity of staining for a period of at least two months and had not lost any of the original staining characteristics upon expiration of that period. The slides which were prepared with the mounting medium were stored in light-proof slide boxes of a standard type and were examined daily during the period. The high refractive index of the composition was reported to be an advantage over the aqueous type mountant previously used and was reported to permit better definition and resolution.

In the above tests the specimens were mounted as follows: Glass slides were treated with fluorescent labelled sera in the usual manner according to the Culling technique reported by C. F. A. Culling in Handbook of Histopathological Technique, 2nd edition, 1963, Butterworths, London. The preparations were then washed four times in phosphate-buffered saline having a pH of 7.1. The excess saline was drained onto filter paper, and the preparations were permitted to dry in air at room temperature without treating with alcohol. The slides were then placed in xylene, and if they did not clear immediately they were removed and blotted lightly with fine fluffless filter paper and permitted to dry. They were then replaced in the xylene, and this procedure of blotting and replacing in xylene was continued until the preparations became clear and transparent. Once clarified, the slide was removed from xylene, and excess xylene was wiped from the back of the slide and around the preparation on the front. A drop of the mounting medium was then placed on the slides, and the cover slip was applied, taking care to avoid trapping air bubbles. The slides, using the mounting medium of this invention, were found to be capable of being examined under a fluorescent microscope immediately, and after permitting them to stand overnight they could be stored in an upright position. It was reported by the laboratory that the composition provided a simple method of making permanent or semi-permanent fluorescent antibody preparations which were efficient and inexpensive and should be of use in many of the routine diagnostic, as well as immunological, research laboratory procedures.

In subsequent tests the present mounting medium was found to be highly suitable for the Vassar and Culling technique for amyloid, reported at Arch. Path., 71:76 (1961), and was found to be useful in the Vassar and Culling acridine orange technique for mounting RNA and DNA stained smears and sections while no other commercially available mounting medium was useful.

The foregoing detailed description is given for clearness of understanding only, and no unnecessary limitations are to be understood therefrom, as some modifications will be obvious to those skilled in the art.

All percents given herein are percents by weight unless otherwise indicated.

We claim:

1. As a composition, a liquid shelf stable non-fluorescent mounting medium for mounting biological specimens on glass and like mounting surfaces, which composition comprises a liquid aromatic hydrocarbon solvent and a metal oxide-treated peroxide polymerized thermoplastic solid soluble polymer of n-butyl methacrylate dissolved in said solvent, said polymer having been treated at a temperature above its melting point with from about 0.01 to about 1.0% by weight of metal oxide, said polymer being present in an amount sufficient to adhere a specimen to the mounting surface, said solution being free of oxidizing and reducing agents.

2. The composition of claim 1 wherein said polymer is poly-n-butyl methacrylate.

3. The composition of claim 2 wherein said poly-n-butyl methacrylate has a specific gravity of about 1.06, a refractive index of about 1.4883, a softening point of about 53° C., a tensile strength of about 500 p.s.i., elongation to break of about 300% at 50% RH and 73° F., and a viscosity of about .53 determined with .25 of the polymer in 50 ml. of chloroform at 20° C. using a No. 50 Cannon-Fenske viscometer.

4. The composition of claim 1 wherein said solution has a consistency of about that of use dilution maple syrup.

5. The composition of claim 1 containing a metal oxide in an amount of from .01 to .05 weight percent.

6. The composition of claim 5 wherein said metal oxide is litharge.

7. The composition of claim 1 wherein said polymer is present in an amount in the range of 15-55 weight percent.

8. The composition of claim 1 wherein said polymer is devoid of peroxide.

9. The method of treating a peroxide polymerized thermoplastic acrylic polymer so as to render it non-fluorescent, which method comprises treating the polymer at a temperature above its melting point with from about .01 to about 1.0 weight percent of the oxide of a metal selected from the metals of Groups 1a, 2a, 3a, 4a and 5a of the Periodic Table.

10. The method of claim 9 wherein said metal oxide is litharge.

11. The method of claim 9 wherein said polymer is a polymer of n-butyl methacrylate.

12. The method of claim 11 wherein said polymer is a solid acrylic polymer and including the step of heating the polymer to said temperature.

13. A liquid shelf stable mounting medium for mounting specimens on glass and like smooth surfaces which comprises a liquid solution of a metal oxide-treated peroxide polymerized solid thermoplastic ancrylic polymer in a liquid aromatic hydrocarbon solvent, said polymer having been treated at a temperature above its melting point with from about 0.01 to about 1.0% by weight of metal oxide, said solution having fluorescent values less than about 10 when tested at a level of 36.5% of polymer in the solvent on a Beckman ratio fluorometer with a wave length of 360 mu excitation and 450 mu emittance and using a No. 3 uranium glass reference rod.

References Cited

UNITED STATES PATENTS

| | | | |
|---|---|---|---|
| 2,451,177 | 10/1948 | Senegen | 260—89.55 |
| 2,514,427 | 7/1950 | Trimble. | |
| 2,676,942 | 4/1954 | Glass. | |
| 2,928,801 | 3/1960 | Sacord et al. | 260—45.75 |
| 3,116,266 | 12/1963 | Stivers et al. | 260—45.75 |

OTHER REFERENCES

Schildknecht, Colvin E.: Vinyl and Related Polymers, John Wiley & Sons, Inc. New York, 1952, pp. 229-233.

MORRIS LIEBMAN, Primary Examiner

J. H. DERRINGTON, Assistant Examiner

U.S. Cl. X.R.

156—57; 260—89.5